United States Patent
Nakashima

(10) Patent No.: US 9,154,728 B2
(45) Date of Patent: Oct. 6, 2015

(54) IMAGE PROCESSING APPARATUS, IMAGE CAPTURING APPARATUS, AND PROGRAM

(71) Applicant: Panasonic Corporation, Osaka (JP)

(72) Inventor: Toshiyuki Nakashima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 173 days.

(21) Appl. No.: 13/738,280

(22) Filed: Jan. 10, 2013

(65) Prior Publication Data

US 2013/0176447 A1 Jul. 11, 2013

(30) Foreign Application Priority Data

Jan. 11, 2012 (JP) .................................. 2012-002738

(51) Int. Cl.
  *H04N 5/232* (2006.01)
  *H04N 7/01* (2006.01)
(52) U.S. Cl.
  CPC ........... *H04N 7/014* (2013.01); *H04N 5/23251* (2013.01); *H04N 5/23264* (2013.01); *H04N 7/0132* (2013.01)
(58) Field of Classification Search
  CPC .................... H04N 19/00054; H04N 5/23232; H04N 7/01; H04N 7/0137; H04N 7/014; H04N 7/0142
  USPC ...................................................... 348/222.1
  See application file for complete search history.

(56) References Cited

U.S. PATENT DOCUMENTS

| | | | | |
|---|---|---|---|---|
| 8,768,103 | B2* | 7/2014 | Ogino et al. | 382/300 |
| 2007/0140347 | A1* | 6/2007 | Moon et al. | 375/240.16 |
| 2008/0089419 | A1* | 4/2008 | Kervec et al. | 375/240.17 |
| 2008/0240617 | A1* | 10/2008 | Douniwa | 382/300 |
| 2009/0225174 | A1* | 9/2009 | Handa et al. | 348/208.3 |
| 2010/0053451 | A1* | 3/2010 | Seong et al. | 348/699 |
| 2011/0267536 | A1* | 11/2011 | Noguchi | 348/441 |
| 2012/0113278 | A1* | 5/2012 | Okada | 348/208.4 |

FOREIGN PATENT DOCUMENTS

| | | |
|---|---|---|
| JP | 61-125295 A | 6/1986 |
| JP | 2006-317848 A | 11/2006 |
| JP | 2010-177739 A | 8/2010 |

OTHER PUBLICATIONS

Co-pending U.S. Appl. No. 13/738,069, filed Jan. 10, 2013.
Co-pending U.S. Appl. No. 13/738,132, filed Jan. 10, 2013.
Co-pending U.S. Appl. No. 13/738,439, filed Jan. 10, 2013.

* cited by examiner

*Primary Examiner* — James Hannett
(74) *Attorney, Agent, or Firm* — Renner, Otto, Boisselle & Sklar, LLP

(57) ABSTRACT

An exemplary image processing apparatus generates an interpolation frame to be inserted between a first frame and a second frame, contiguous with each other, of a moving picture obtained by an image capturing apparatus. The image processing apparatus includes: a motion vector calculation section configured to calculate a motion vector of an object by performing a block matching operation between the first and second frames; and an interpolation frame generation section configured to generate the interpolation frame through a process performed based on a magnitude of motion of the image capturing apparatus from a point in time when the first frame is obtained to a point in time when the second frame is obtained.

10 Claims, 7 Drawing Sheets

FIG. 4
(a) FIRST FRAME
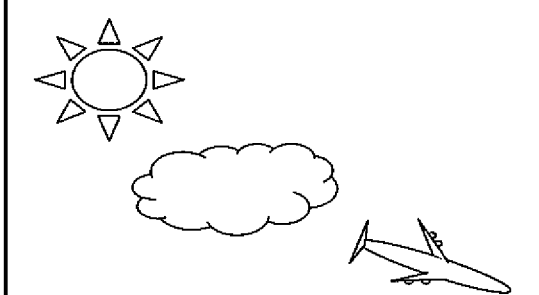
(b) MOTION-COMPENSATED INTERPOLATION FRAME
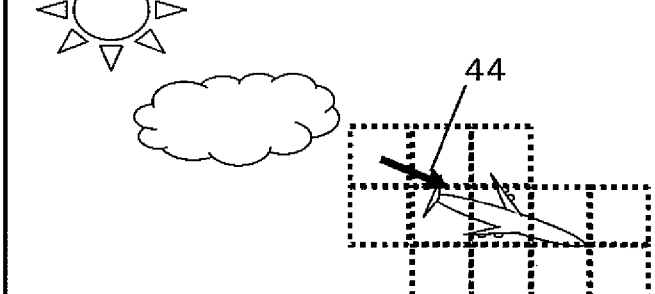
(c) SECOND FRAME
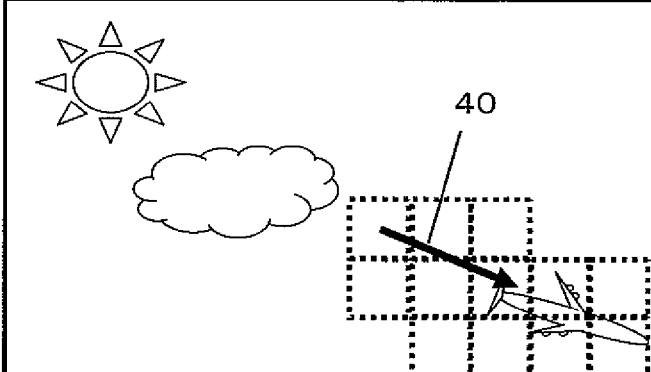

FIG.5A
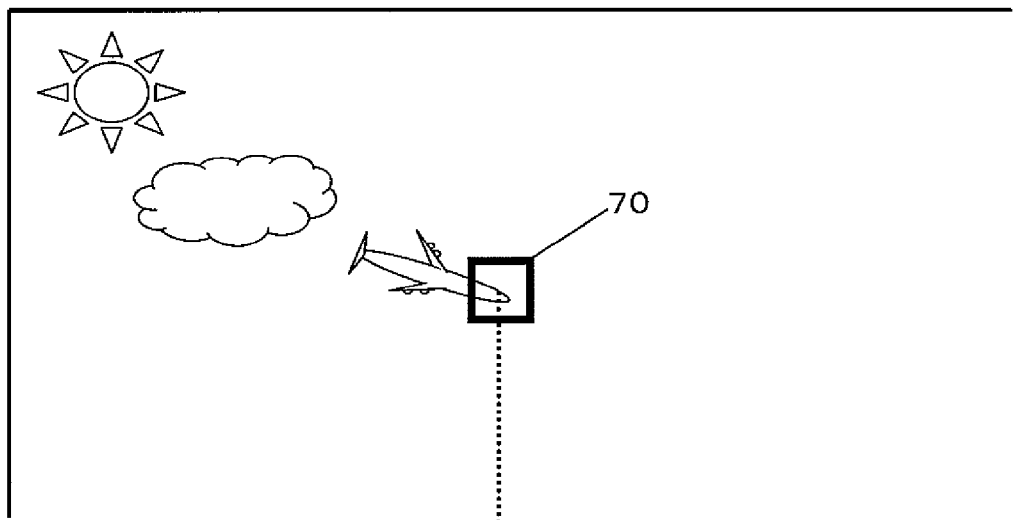
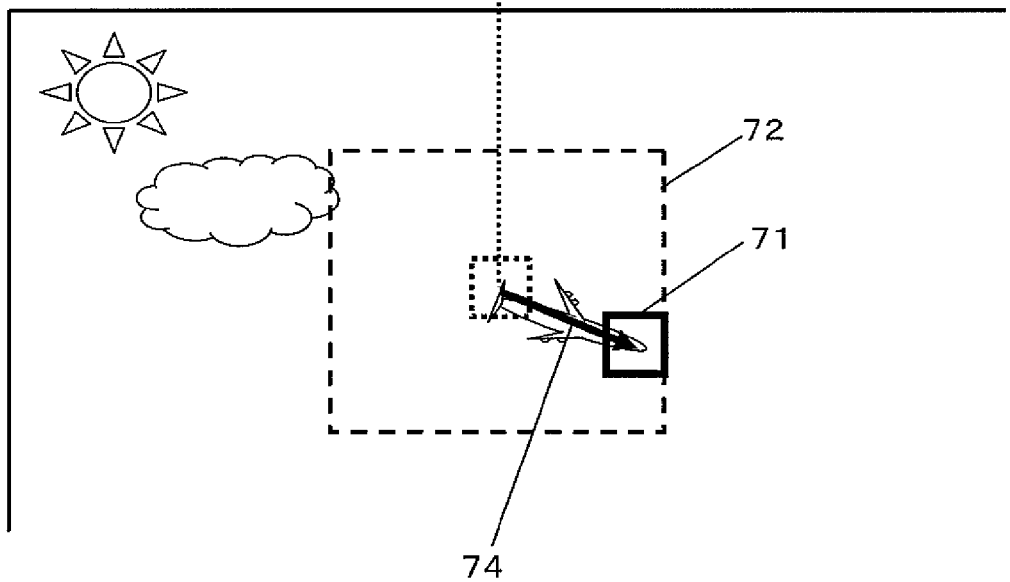

FIG.5B
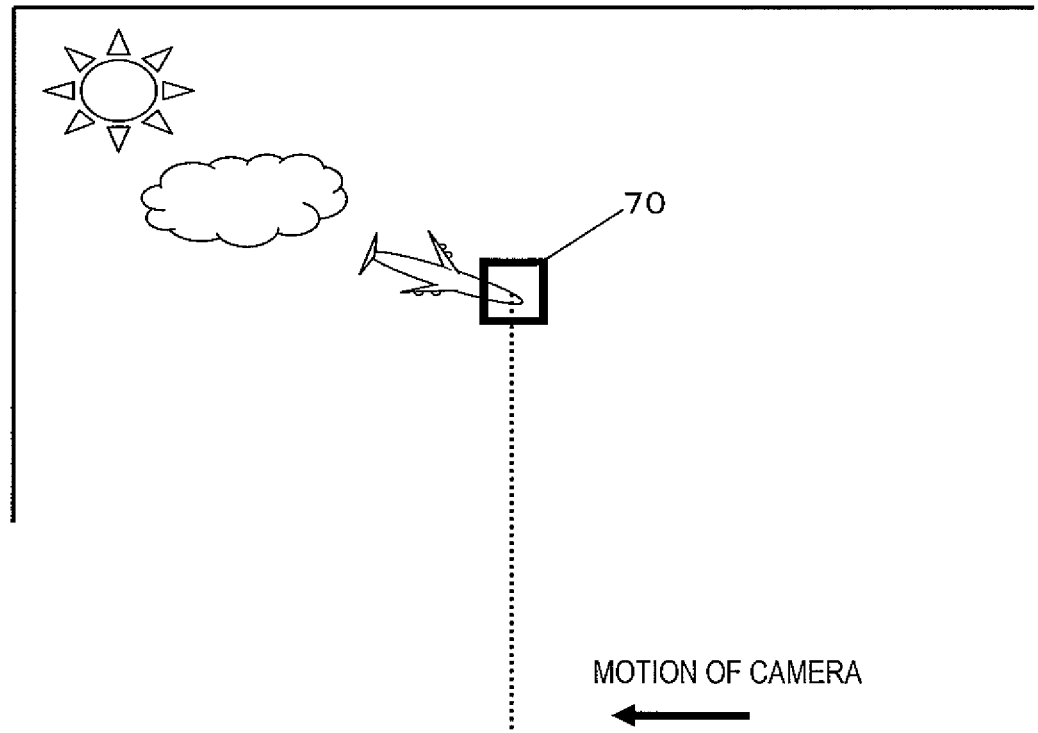
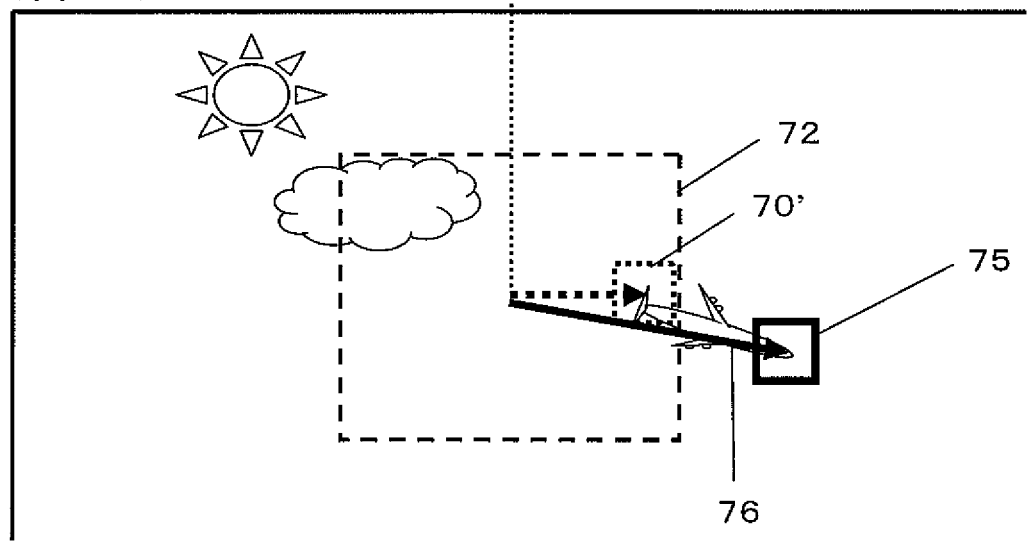

FIG.5C
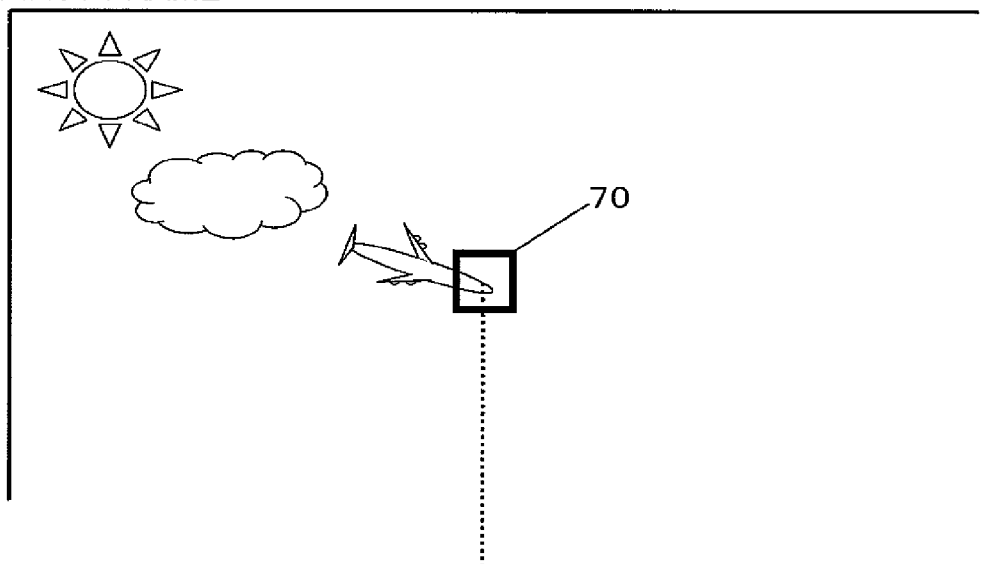
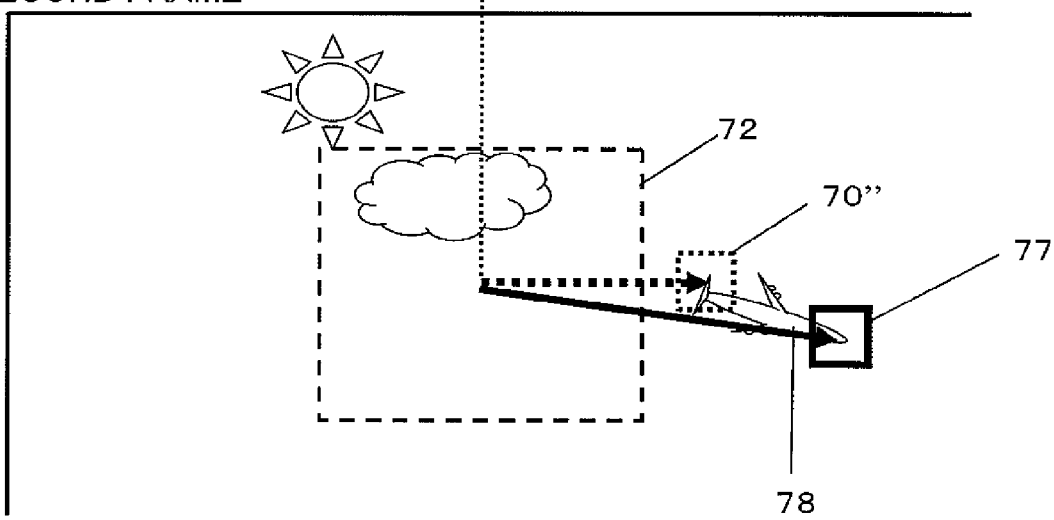

IMAGE PROCESSING APPARATUS, IMAGE CAPTURING APPARATUS, AND PROGRAM

BACKGROUND

1. Technical Field

The present disclosure relates to an image processing technique capable of converting a frame rate of a moving picture obtained through an image capturing operation.

2. Description of the Related Art

Japanese Laid-Open Patent Publication No. 2010-177739 discloses an image processing apparatus. The image processing apparatus generates interpolation frame images to be inserted between frame images. The image processing apparatus of Japanese Laid-Open Patent Publication No. 2010-177739 calculates the search area for a motion vector of an interpolation pixel included in an interpolation frame image based on a change in the pixel value within each frame of a plurality of frame images, and generates an interpolation frame image based on a motion vector estimated in the calculated search area.

SUMMARY

With a conventional technique, when a digital video camera moves inadvertently due to a camera shake or a panning operation during a movie capturing operation, it may not be possible to obtain a motion vector with a high reliability and to generate an appropriate interpolation frame.

One non-limiting, and exemplary embodiment of the present disclosure provides a technique to generate a more appropriate interpolation frame even if the camera moves.

In one general aspect, an image processing apparatus disclosed herein generates an interpolation frame to be inserted between a first frame and a second frame, contiguous with each other, of a moving picture obtained through an image capturing apparatus. The image processing apparatus includes: a motion vector calculation section configured to calculate a motion vector of an object by performing a matching operation between the first and second frames; and an interpolation frame generation section configured to generate the interpolation frame through a process performed based on a magnitude of motion of the image capturing apparatus from a point in time when the first frame is obtained to a point in time when the second frame is obtained.

According to the above aspect, it is possible to generate a more appropriate interpolation frame even if an image capturing apparatus moves during an image capturing operation.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 4 is a diagram showing a process of generating a motion vector and a motion-compensated interpolation frame from first and second frames contiguous with each other.

FIG. 5A is a diagram showing an example of how a motion vector is calculated when the digital video camera is held still.

FIG. 5B is a diagram showing an example of how a motion vector is calculated when the digital video camera is moving.

FIG. 5C is a diagram showing an example of how a motion vector is calculated when the digital video camera is moving significantly.

DETAILED DESCRIPTION

Figure 1:
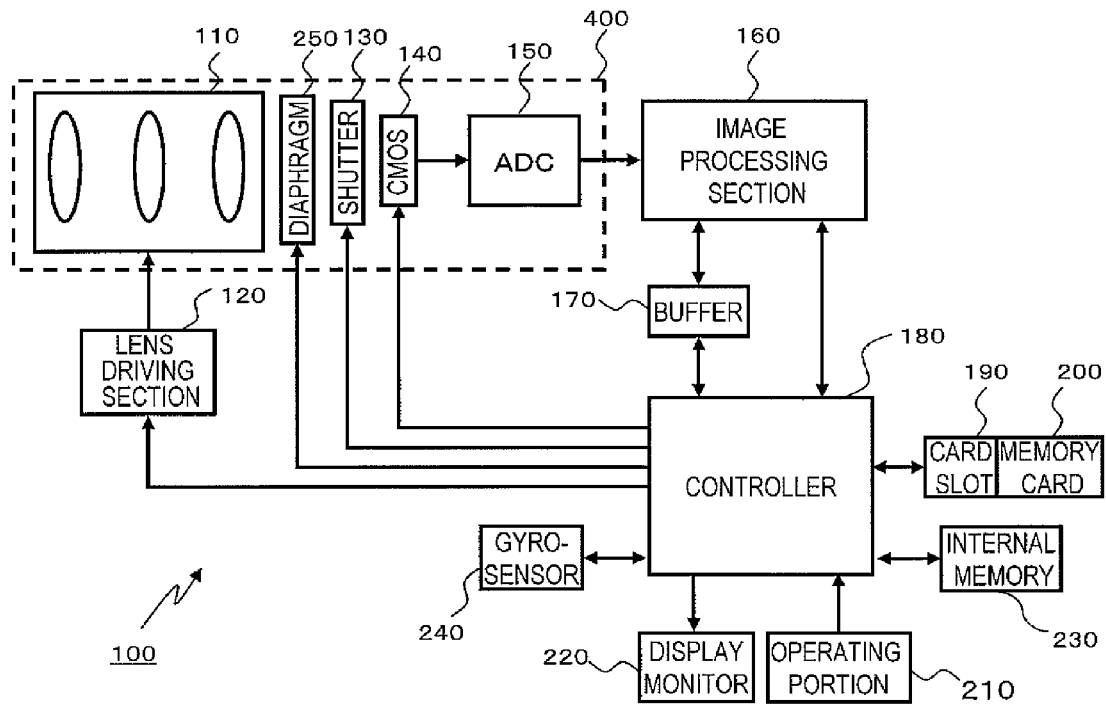
FIG. 1 is a block diagram showing a configuration of a digital video camera according to exemplary Embodiment 1.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand. Note that the present inventors provide the accompanying drawings and the following description in order for a person of ordinary skill in the art to sufficiently understand the present disclosure, and they are not intended to limit the subject matter set forth in the claims.

Embodiment 1

Embodiment 1, in which the technique of the present disclosure is applied to a digital video camera, will now be described. In the following description, data representing each of the individual still images of a moving picture will be referred to a "frame image" or simply a "frame". A frame to be inserted between two contiguous frames will be referred to as an "interpolation frame image" or simply an "interpolation frame".

[1-1. Outline]

A digital video camera (hereinafter also referred to simply as a "camera") of the present embodiment is an image capturing apparatus capable of capturing a moving picture. The digital video camera of the present embodiment is capable of converting a frame rate on-the-fly during the operation of capturing a moving picture, or after the operation, in response to a user instruction, etc. The digital video camera of the present embodiment changes the frame rate by inserting an interpolation frame image between frame images obtained through an image capturing operation. For example, when performing a movie capturing operation at frames per second, the operation can be switched to a movie capturing operation at 120 frame per second by inserting interpolation frame images between frames. The time when the digital video camera switches frame rates from one to another may be when a user gives an instruction to change the frame rate, when information (e.g., brightness information) obtained from an image captured through an image capturing operation (hereinafter also referred to as a "captured image".) is changed, or when a predetermined mode (e.g., a low-speed image capturing mode) is selected.

[1-2. Configuration of Digital Video Camera]

Now, a configuration of a digital video camera 100 according to the present embodiment will be described with reference to FIG. 1. FIG. 1 is a block diagram showing a configuration of the digital video camera 100. The digital video camera 100 uses a CMOS image sensor 140 to capture an object image formed by an optical system 110 including one or more lenses. The image data generated by a CMOS image sensor 140 is subjected to various processes by an image processing section 160, and stored in a memory card 200.

The optical system 110 has a group of lenses, including a zoom lens and a focus lens. By moving the zoom lens along the optical axis, it is possible to enlarge/shrink the object image. By moving the focus lens along the optical axis, it is possible to adjust the focus of the object image. Note that while three lenses are shown in FIG. 1 as an example, the number of lenses of the optical system 110 is appropriately determined in accordance with the required functionality.

A lens driving section 120 drives various lenses included in the optical system 110. The lens driving section 120 includes, for example, a zoom motor for driving the zoom lens and a focus motor for driving the focus lens.

A diaphragm 250 adjusts the size of the opening, thereby adjusting the amount of light to pass therethrough, in accordance with the user settings or automatically.

A shutter 130 blocks light from entering the CMOS image sensor 140.

The CMOS image sensor 140 is an image capturing device for generating image data through photoelectric conversion of an object image formed by the optical system 110. The CMOS image sensor 140 performs various operations, such as exposure, transfer, electronic shutter, etc. The CMOS image sensor 140 generates new image data at intervals of a certain amount of time. While the CMOS image sensor 140 is used as an image capturing device in the present embodiment, image capturing device of other types may also be used, such as a CCD image sensor or an NMOS image sensor.

An A/D converter (ADC) 150 is a circuit, electrically connected to the CMOS image sensor 140, for converting analog image data generated by the CMOS image sensor 140 to digital image data.

In the present embodiment, a plurality of elements including the optical system 110, the diaphragm 250, the shutter 130, the CMOS sensor 140 and the ADC 150 together form an image capturing section 400. The image capturing section 400 generates and outputs digital moving picture data including a plurality of contiguous frames.

The image processing section 160 can be implemented by a digital signal processor (DSP), a microcomputer, or the like, for example. The image processing section 160 is electrically connected to the ADC 150, and performs various processes on the image data generated by the CMOS image sensor 140, to generate image data to be displayed on a display monitor 220, and image data to be stored in the memory card 200. The image processing section 160 performs various processes, such as gamma correction, white balance correction, scar correction, etc., for example, on the image data generated by the CMOS image sensor 140. The image processing section 160 compresses image data generated by the CMOS image sensor 140 in accordance with a compression scheme, etc., in conformity with the H.264 standard, the MPEG2 standard, or the like.

The image processing section 160 can further calculate the motion vector based on the image data (frame image) generated by the CMOS image sensor 140. Then, the image processing section 160 can generate an interpolation frame image by motion compensation based on the calculated motion vector and the frame image associated with the motion vector. Alternatively, the image processing section 160 can generate an interpolation frame through averaging by adding together a plurality of correlated frame images at a predetermined ratio without using motion compensation. The details of the process of generating these interpolation frames will be described later.

A controller 180 is a control means for controlling the entire digital video camera. The controller 180 can be implemented by a semiconductor device, or the like. The controller 180 may be implemented only by hardware, or may be implemented by a combination of hardware and software. The controller 180 can be implemented by, for example, a microcomputer, or the like. Alternatively, it may be implemented by a single semiconductor chip, together with the image processing section 160, etc. As shown in FIG. 1, the controller 180 is electrically connected to the image processing section 160 and various other sections, and sends control signals thereto.

Note that the image processing section 160 and the controller 180 may be implemented by separate semiconductor chips or by a single semiconductor chip. There is no limitation on these physical configurations as long as processes to be described later can be realized.

A buffer 170 is electrically connected the image processing section 160 and the controller 180, and serves as a work memory thereof. The buffer 170 can be implemented by, for example, a DRAM, a ferroelectric memory, or the like.

A card slot 190 is capable of receiving the memory card 200, and can be mechanically and electrically connected to the memory card 200. The memory card 200 includes therein a flash memory, a ferroelectric memory, or the like, and can store data such as an image file generated by the image processing section 160.

An internal memory 230 is implemented by a flash memory, a ferroelectric memory, or the like. The internal memory 230 stores a control program, etc., for controlling the entire digital video camera 100. The control program is executed by the controller 180.

A operating portion 210 generally refers to a user interface via which user operations are accepted. The operating portion 210 includes, for example, a cross-shaped key, an OK button, and the like, via which user operations are accepted.

The display monitor 220 is capable of displaying an image (through image) represented by image data generated by the CMOS image sensor 140, and an image represented by image data read out from the memory card 200. The display monitor 220 can also display various menu screens, etc., used for changing various settings of the digital video camera 100.

A gyrosensor 240 is a motion detector for detecting a shake in the yawing direction and a movement in the pitching direction based on the angular change over unit time, i.e., the angular velocity, of the digital video camera 100. The gyrosensor 240 outputs a gyro signal, representing the detected amount of movement, to the controller 180. Note that a motion detector of a different type, such as an acceleration sensor, may be provided instead of, or in addition to, the gyrosensor 240. There is no limitation on the configuration of the motion detector as long as it is a sensor capable of detecting the motion of the subject apparatus during an image capturing operation.

Note that the configuration described above is merely an example, and the digital video camera 100 may have any configuration as long as the image processing section 160 can perform an operation to be described below.

[1-3. Operation]

Now, an operation of the digital video camera 100 according to the present embodiment will be described. The digital video camera 100 generates, from a first frame and second frame contiguous in time with each other, an interpolation frame to be inserted between the first frame and the second frame. The digital video camera 100 generates an appropriate interpolation frame through a process performed based on the magnitude of motion of the subject apparatus detected by the gyrosensor 240.

Figure 2:
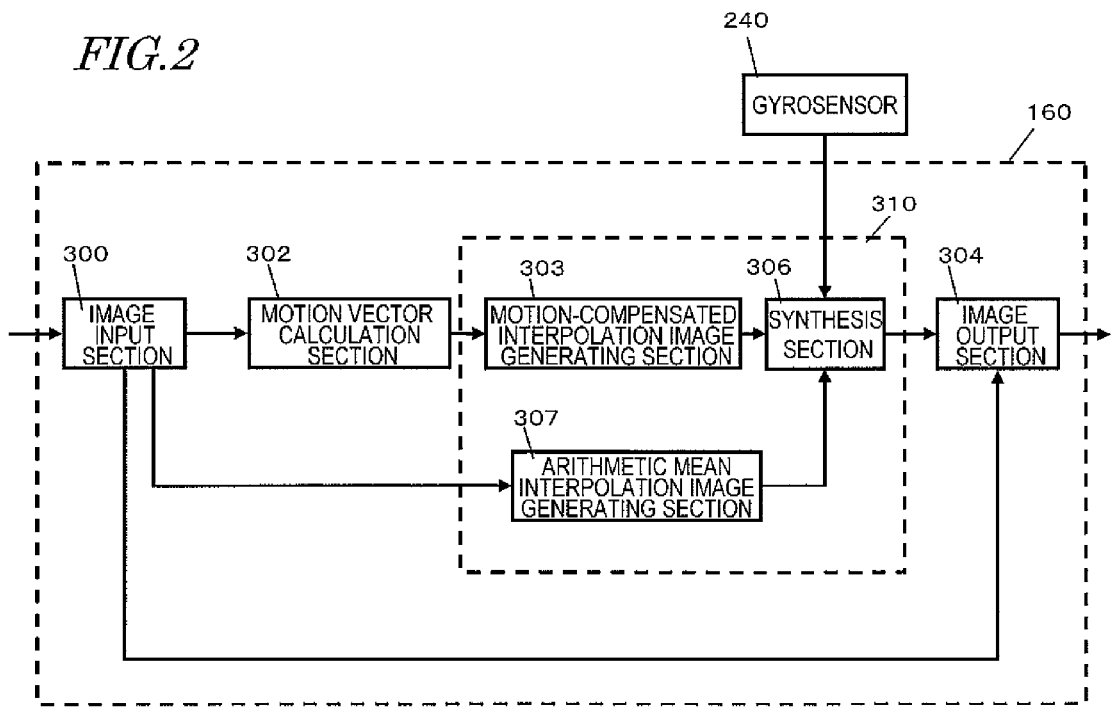
FIG. 2 is a block diagram showing a configuration of an image processing section 160 of the digital video camera according to exemplary Embodiment 1.

FIG. 2 is a block diagram showing a configuration of the image processing section 160 for realizing the operation described above of the digital video camera according to the present embodiment. FIG. 2 shows the gyrosensor 240 as well as the image processing section 160. Note that while the gyrosensor 240 is configured to exchange electric signals with the image processing section 160 via the controller 180, as shown in FIG. 1, the controller 180 is not shown in FIG. 2 for the sake of simplicity.

The image processing section 160 includes the image input section 300 for receiving moving picture data output from the image capturing section 400, the motion vector calculation section 302 for calculating a motion vector between two contiguous frames, the interpolation frame generation section 310 for generating an interpolation frame to be inserted between two frames, and the image output section 304 for outputting the moving picture data where interpolation frames have been inserted to the outside. The interpolation frame generation section 310 includes the motion-compensated interpolation image generating section 303 for generating an interpolation frame based on the motion vector, the arithmetic mean interpolation image generation section 307 for generating an interpolation frame obtained by obtaining the arithmetic mean between the first and second frames, and the synthesis section 306 for generating a correction frame based on the motion of the digital video camera 100 detected by the gyrosensor 240 during the image capturing operation.

These elements of the image processing section 160 may be implemented by individual circuit blocks that are physically separated from one another and electrically connected to one another, or may be implemented by a processor provided in the image processing section 160 executing programs defining the processes of the elements. The connection between these sections is not limited to the configuration of FIG. 2, but may be configured so that signals are exchanged via buses that are not shown or a recording medium. Each functional section may be further divided into a plurality of functional sections, or a plurality of functional sections may be integrated into a single functional section.

The image input section 300 is implemented by terminals for receiving contiguous frames from outside and sending data to the motion vector calculation section 302, the arithmetic mean interpolation image generation section 307 and the image output section 304, and circuits around the terminals. The motion vector calculation section 302 calculates a motion vector by performing a matching operation between the first and second frames contiguous with each other. The motion vector calculation section 302 outputs the calculated motion vector and first and second frames contiguous with each other to the motion-compensated interpolation image generating section 303. The motion-compensated interpolation image generating section 303 generates, from the first and second frames and the motion vector received, a frame (motion-compensated interpolation frame) representing the intermediate state between the first and second frames, and outputs the generated frame to the synthesis section 306. On the other hand, the arithmetic mean interpolation image generation section 307 generates a frame (arithmetic mean interpolation frame) representing the arithmetic mean between the two contiguous frames received from the image input section 300 for each pixel, and outputs the generated frame to the synthesis section 306. The synthesis section 306 generates and outputs an appropriate interpolation frame to the image output section 304 based on the images received from the motion-compensated interpolation image generating section 303 and the arithmetic mean interpolation image generation section 307, and information representing the motion of the digital video camera 100 received from the gyrosensor 240. The image output section 304 inserts the interpolation frame output from the synthesis section 306 between the first and second frames contiguous with each other, and outputs the resultant data to the outside.

The operation of the digital video camera 100 during the image capturing operation will now be described.

When the power is turned ON, a controller 180 supplies power to various sections of the digital video camera 100. The digital video camera 100 can be switched between the shooting mode and the playback mode by a user operation, or the like. After power is supplied, if the digital video camera 100 has been set in the shooting mode, the controller 180 initializes the optical system 110, the CMOS image sensor 140, etc., to set up the camera ready for shooting. Upon completing the setup operation for shooting, the controller 180 controls the CMOS image sensor 140 to capture an image, instructs the image processing section 160 so as to convert the image signal, which has been converted by an A/D converter 150 to a digital signal, to a signal that can be displayed as the through image, and performs a control so that the generated through image is displayed on the display monitor 220. By looking at the through image displayed on the display monitor 220, the user can check the angle of view, the object, etc., during the image capturing operation. The user can depress a movie recording button (a part of the operating portion 210) at any point in time to instruct the controller 180 to record a moving picture. Upon receiving an instruction to record a moving picture, the controller 180 processes the image being captured by the CMOS image sensor 140 as a moving picture in a format in conformity with a predetermined standard, and starts recording the processed moving picture data on the memory card 200. On the other hand, the user can depress the movie recording button at any point in time during the movie recording operation to instruct the controller 180 to end the moving picture recording operation.

With the digital video camera 100, it is possible to change the frame rate of the moving picture captured during the movie recording operation. The time when the frame rate is changed may be, for example, when a user gives an instruction, when information (e.g., brightness information) obtained from the captured image is changed, or when a predetermined mode (e.g., a low-speed image capturing mode) is selected. Alternatively, a change of the frame rate may be programmed in advance.

When the frame rate needs to be changed, the image processing section 160 generates an interpolation frame image to be inserted between frame images. The process of generating the interpolation frame by the image processing section 160 will now be described.

Figure 3:
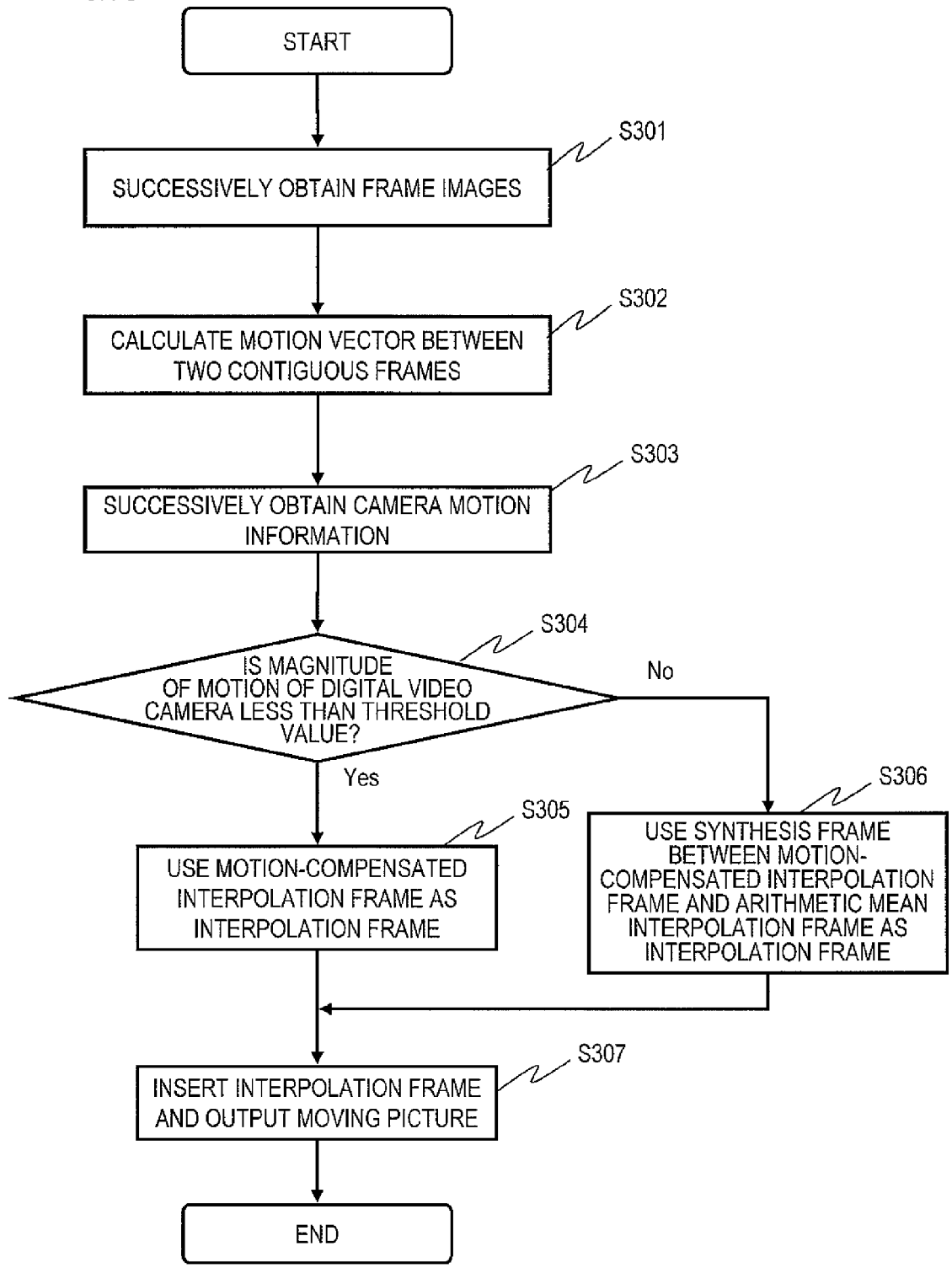
FIG. 3 is a flow chart showing an operation performed by the image processing section of the digital video camera according to exemplary Embodiment 1.

FIG. 3 is a flow chart showing the interpolation frame generating process performed by the image processing section 160. First, in step S301, the image input section 300 successively obtains frame images output from the image capturing section 400 (S301). The frame images obtained by the image input section 300 are sent to the motion vector calculation section 302, the arithmetic mean interpolation image generation section 307, and the image output section 304.

Then, in step S302, the motion vector calculation section 302 calculates a motion vector between two contiguous frames received from the image input section 300. The motion vector is calculated through a block matching operation, to be described later, performed between the two contiguous frames. Information representing the calculated motion vector is sent to the motion-compensated interpolation image generating section 303.

Then, in step S303, the synthesis section 306 obtains a gyro signal representing the motion of the digital video camera 100 detected by the gyrosensor 240. Note that step S303 may be performed in parallel to, or prior to, step S301 or step S302.

Then, in step S304, the synthesis section 306 determines whether the magnitude of the camera motion represented by the gyro signal output from the gyrosensor is less than a predetermined threshold value. In the present embodiment, the threshold value is determined based on the search range of the block matching operation. Then, if the magnitude of the camera motion is less than the threshold value, the motion-compensated interpolation image generated by the motion-compensated interpolation image generating section 303 is output as the interpolation frame in step S305. On the other hand, if the magnitude of the camera motion is greater than or equal to the threshold value, a synthetic frame between the motion-compensated interpolation frame and an arithmetic mean interpolation frame generated by the arithmetic mean interpolation image generation section 307 is generated as the interpolation frame and output to the image output section 304 in step S306. Then, in step S307, the image output section 304 inserts the interpolation frame received from the synthesis section 306 between two corresponding frames, and outputs the interpolated moving picture.

Through the process described above, there is generated a moving picture having a higher frame rate with interpolation frames inserted between two contiguous frames. Now, the motion vector calculation process in step S303 and the interpolation frame generation section in steps S304 to S306 will be described in greater detail.

The motion vector calculation section 302 obtains a plurality of frames contiguous in time with each other from the image input section 300. The motion vector calculation section 302 calculates a motion vector by performing a block matching operation between two frames contiguous in time with each other. Block matching is a method of dividing one of two contiguous frames into a plurality of macroblocks, and using each of the macroblocks as the template macroblock to find a matching position in a predetermined search range of the other frame at which the similarity to the template macroblock is highest (the predetermined search range is centered about the position corresponding to the template macroblock). Thus, since it is possible, for each macroblock in one of the frames, to identify the corresponding position in the other frame, it is possible to obtain a motion vector for each macroblock.

The motion vector calculation section 302 calculates a motion vector for each macroblock including 16 pixels×16 pixels, for example. Specifically, the difference (e.g., SAD: Sum of Absolute Difference) is successively calculated by comparing a macroblock in one of the first and second frames contiguous in time with each other with another block of 16 pixels×16 pixels obtained by shifting the macroblock in the horizontal direction and in the vertical direction, within a predetermined search range, from the pixel position in the other frame corresponding to this macroblock. Another evaluation value, such as SSD (Sum of Absolute Difference), may be used instead of SAD. The motion vector calculation section 302 calculates the difference while gradually shifting the pixels. Then, the distance and the direction (the horizontal component and the vertical component) from the pixel corresponding to the center position of the macroblock being processed to the position of the pixel at which the difference takes the minimum. Through such a process, the motion vector calculation section 302 calculates the motion vector.

Where SAD is used as the evaluation function, the motion vector $(dx(x,y),dy(x,y))$ at the coordinate position $(x,y)$ on the image is determined by obtaining dx and dy that minimize the evaluation function $P1(x,y,dx,dy)$ represented by Expression 1 below. Herein, the size of the macroblock, calculated in the number of pixels, in the horizontal direction (the x direction) of the image and that in the vertical direction (the y direction) are denoted as Bx and By, respectively. Of the two frames to be compared with each other, the pixel value (the brightness value or the value of a particular color component) of the preceding frame is denoted as L1, and that of the following frame as L2.

$$P1(x, y, dx, dy) = \sum_{i=-Bx/2}^{Bx/2} \sum_{j=-By/2}^{By/2} |L1(x+i, y+j) - L2(x+dx+i, y+dy+j)|$$ (Expression 1)

On the other hand, where SSD is used as the evaluation function, the motion vector $(dx(x,y),dy(x,y))$ at the coordinate position $(x,y)$ on the image is determined by obtaining dx and dy that minimize the evaluation function $P2(x,y,dx,dy)$ represented by Expression 2 below.

$$P2(x, y, dx, dy) = \sum_{i=-Bx/2}^{Bx/2} \sum_{j=-By/2}^{By/2} (L1(x+i, y+j) - L2(x+dx+i, y+dy+j))^2$$ (Expression 2)

By using an evaluation function represented by Expression 1 or 2, the motion vector calculation section 302 can calculate the motion vector $(dx(x,y),dy(x,y))$ for each macroblock.

The motion vector calculation section 302 sends, to the motion-compensated interpolation image generating section 303, a plurality of frame images contiguous in time with each other obtained from an image input section 330 and the motion vector calculated for each of the macroblocks of the frame being processed.

The motion-compensated interpolation image generating section 303 shifts an image portion represented by the macroblock which was being processed when calculating a motion vector from one of the frame images contiguous in time with each other to an intermediate position that is dictated by the motion vector. That is, where the motion vector of the macroblock is represented by (dx,dy), the image portion represented by the macroblock is shifted by (dx/2,dy/2).

Hereinafter, this process will be referred to as the "motion-compensated interpolation". By similarly performing motion-compensated interpolation for the macroblocks of the frame, the motion-compensated interpolation image generating section 303 can generate an interpolation frame image (motion-compensated interpolation frame) to be inserted between frame images contiguous in time with each other. The motion-compensated interpolation image generating section 303 sends the generated motion-compensated interpolation frame image to the synthesis section 306. Note that the motion-compensated interpolation frame image does not always have to be an intermediate frame, as long as it is a frame representing a transitional state between the two contiguous frames generated based on the motion vector. For example, where two or more interpolation frames are inserted between two contiguous frames, a motion-compensated interpolation frame image represents a state that is closer to either one of the frames, rather than an intermediate state therebetween.

FIG. 4 shows diagrams illustrating the concept of the process performed by the motion vector calculation section 302 and the motion-compensated interpolation image generating section 303. FIGS. 4(a) to 4(c) show examples of a first frame, a motion-compensated interpolation frame, and a second frame, respectively. FIGS. 4(b) and 4(c) show macroblocks (dotted line) in which a motion has been detected between the first and second frames. In this example, no motion has been detected in macroblocks other than those represented by dotted line. The motion vector calculation section 302 calculates a motion vector 40 for some of the macroblocks represented by dotted line in FIG. 4(c). FIG. 4(c) only shows the motion vector 40 corresponding to one, upper left, macroblock. Then, the motion-compensated interpolation image generating section 303 moves each macroblock in which a motion has been detected from the position thereof in the first frame by the distance of a vector 44 that is half the length of the corresponding motion vector 40, as shown in FIG. 4(b). FIG. 4(b) also only shows a vector corresponding to the one, upper left, macroblock. Thus, a motion-compensated interpolation frame is generated as shown in FIG. 4(b).

On the other hand, the arithmetic mean interpolation image generation section 307 obtains frames contiguous in time with each other from the image input section 300. Then, the arithmetic mean interpolation image generation section 307 calculates the arithmetic mean pixel by pixel for the two frames contiguous in time with each other, between which an interpolation frame is to be sandwiched. Thus, the arithmetic mean interpolation image generation section 307 generates the arithmetic mean interpolation frame image. The arithmetic mean interpolation image generation section 307 sends the generated arithmetic mean interpolation frame image to the synthesis section 306.

A gyro signal detected by the gyrosensor 240 is input to the synthesis section 306. The gyrosensor 240 outputs a gyro signal representing the detected amount of movement of the digital video camera 100 (the subject apparatus) to the controller 180 in sync with the timing with which frames are obtained. The controller 180 converts the amount of movement of the subject apparatus to the number of pixels based on the gyro signal obtained from the gyrosensor 240. The controller 180 sends the amount of movement of the subject apparatus, which has been converted to the number of pixels, to the synthesis section 306.

In step S304, the synthesis section 306 determines the synthesis ratio between the motion-compensated interpolation frame image obtained from the motion-compensated image generating section 303 and the arithmetic mean interpolation frame image obtained from the arithmetic mean interpolation image generation section 307, based on the magnitude of motion of the subject apparatus (a value which has been converted to the number of pixels) obtained from the controller 180. That is, the synthesis section 306 generates an interpolation frame image to be inserted between frame images based on the magnitude of motion of the subject apparatus.

Herein, the motion-compensated interpolation frame is denoted as F1 and the arithmetic mean interpolation frame as F2, with the coefficients thereof being $\alpha$ ($0<\alpha<1$) and $\beta$ ($=1-\alpha$), respectively. The interpolation frame F to be eventually adopted is generated in accordance with the following expression.

$$F=\alpha F1+\beta F2 \qquad \text{(Expression 3)}$$

where the calculation of Expression 3 is performed for each pixel, for example.

If the magnitude of motion of the subject apparatus (a value which has been converted to the number of pixels) detected by the gyrosensor 240 is less than a predetermined threshold value, there is only a small possibility of an erroneous detection of a motion vector due to a motion (shake) of the subject apparatus. Therefore, the synthesis section 306 employs the motion-compensated interpolation frame image as an interpolation frame image to be inserted between frame images. On the other hand, if the magnitude of motion of the subject apparatus (a value which has been converted to the number of pixels) detected by the gyrosensor 240 is greater than or equal to the predetermined threshold value, there is a high possibility of an erroneous detection of a motion vector due to a motion (shake) of the subject apparatus. Therefore, the ratio of the arithmetic mean interpolation frame image, which is not influenced by an erroneous detection of a motion vector, is increased as the difference between the magnitude of motion of the subject apparatus and the threshold value is greater.

FIGS. 5A to 5C are diagrams showing how the possibility of an erroneous detection of a motion vector increases as the motion of the digital video camera 100 during an image capturing operation is greater. FIG. 5A is a diagram showing an example of a motion vector of an object in a case where the camera does not move from the point in time when the first frame is obtained to the point in time when the second frame is obtained. In this example, where the camera is held still, the coordinates of a moving object (an airplane) on the image change, but the coordinates of a stationary object (the sun, a cloud, etc.) do not change. Referring to a macroblock 70, which includes a part of the moving airplane, the tip of the airplane which was at the position of the macroblock 70 in the first frame has moved to the position of a block 71 in the second frame. Since the block 71 is within a search range 72 of the block matching operation, a motion vector 74 associated with the macroblock 70 is obtained properly.

FIG. 5B shows an example in which the image as a whole moves to the right due to the motion (rotation) of the digital video camera 100 to the left during the image capturing operation. In this example, the tip of the airplane which was at the position of the macroblock 70 in the first frame would move to the position of a block 70' if the airplane were stationary. However, since the airplane is actually moving, the tip of the airplane which was at the position of the macroblock 70 has moved to the position of a block 75. The block 75 is beyond the search range 72 of the block matching operation, and therefore is not detected in the block matching operation. As a result, a motion vector 76 which is supposed to be obtained is not obtained, but an erroneous motion vector is obtained. On the other hand, in this example, since the digital video camera 100 is moving to such a degree that stationary objects fall just within the search range 72, it is possible to obtain a correct motion vector for the sun or the cloud, which are substantially stationary.

FIG. 5C shows an example in which there is an even greater motion of the camera during the image capturing operation. In this example, the tip of the airplane which was at the position of the macroblock 70 in the first frame would move to the position of a block 70" if the airplane were stationary. However, since the airplane is actually moving, the tip of the airplane which was at the position of the macroblock 70 has moved to the position of a block 77. The block 77 is beyond the search range 72 of the block matching operation, and therefore is not detected in the block matching operation. As a result, a motion vector 78 which is supposed to be obtained is not obtained, but an erroneous motion vector is obtained. Moreover, in this example, since the digital video camera 100 is moving (rotating) to such a degree that even a stationary object is moved beyond the search range 72, it is not possible to obtain a correct motion vector even for a stationary object. Generally, stationary objects account for a larger portion of an image than moving objects, and therefore such a situation as that shown in FIG. 5C is not desirable.

In view of this, in the present embodiment, a motion-compensated interpolation frame is employed as an interpolation frame to be inserted between two frames only when the magnitude of the camera motion is less than a predetermined threshold value. While the threshold value can be appropriately determined depending on the specifications of the camera, it can be, for example, set to be smaller than such a value that a stationary object is included just within the search range of the block matching operation. For example, where the size of a macroblock is 16 pixels horizontal by 16 pixels vertical, and the size of the search range is 160 pixels horizontal by 160 pixels vertical, the threshold value can be set to a value smaller than 72 (=80−8) pixels. With such a setting, even if an erroneous motion vector is calculated for a stationary object, the proportion of the arithmetic mean interpolation frame, which is less dependent on the motion vector, is increased, and it is therefore possible to prevent deterioration of the image quality.

Figure 6:
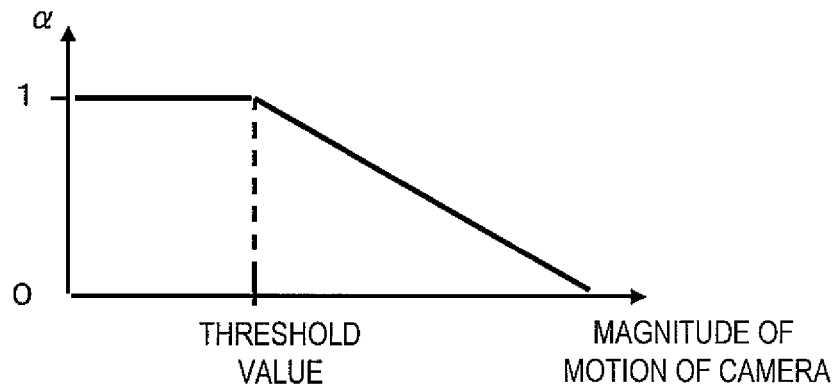
FIG. 6 is a graph showing a transition of the interpolation frame synthesis ratio relative to the magnitude of motion of the digital video camera according to exemplary Embodiment 1.

FIG. 6 is a graph showing an example relationship between the magnitude of motion of the subject apparatus and the coefficient α for a predetermined threshold value. As shown in FIG. 6, until the magnitude of motion of the subject apparatus exceeds the predetermined threshold value, there is only a small possibility of an erroneous detection of a motion vector, and a motion-compensated interpolation frame image, which has a higher image quality, is employed as the image to be inserted between frame images. As the magnitude of motion of the subject apparatus exceeds the predetermined threshold value, the possibility of an erroneous detection of a motion vector increases, and therefore the synthesis ratio α of the motion-compensated interpolation frame image is gradually reduced while increasing the ratio β(=1−α) of the arithmetic mean interpolation frame image, which is not influenced by an erroneous detection of a motion vector. Thus, even if a motion of the subject apparatus occurs during the image capturing operation, it is possible to more appropriately produce the interpolation frame. Note that the predetermined threshold value is not limited to the example above, but may be set to any appropriate value that is determined based on the size of the search range. For example, it may be set to a value that is in proportion to the search range.

The image output section 304 places and inserts the interpolation frame image generated by the synthesis section 306 between two contiguous frame image. Thus, the image processing section 160 can output a moving picture whose frame rate has been changed.

[1-4. Advantageous Effects, Etc.]

As described above, in the present embodiment, the interpolation frame image to be inserted between two contiguous frame images is generated based on the magnitude of motion of the digital video camera 100 detected by a motion detector such as the gyrosensor 240. Thus, it is possible to generate a more appropriate interpolation frame image taking into consideration the possibility of an erroneous detection of a motion vector due to a motion (shake) of the subject apparatus. Therefore, even if the frame rate is changed to a higher frame rate, it is possible to display a moving picture of a higher image quality on the display monitor.

If the magnitude of the camera motion is less than the predetermined threshold value, the interpolation frame generation section 310 generates, as the interpolation frame, a frame (motion-compensated interpolation frame) representing the transitional state between the first and second frames dictated based on the motion vector, and otherwise generates, as the interpolation frame, a frame (synthetic frame or arithmetic mean interpolation frame) that is less dependent on the motion vector than a frame representing the transitional state. Therefore, where there is a high possibility of an erroneous detection of a motion vector, it is possible to avoid generation of a moving picture of a low image quality.

The threshold value can be set to a value that is in proportion to the size of the search range. For example, it can be set to a value that is about 80% to 90% of the value such that a stationary object falls just within the search range of the matching operation. Thus, where there is only a small possibility of an erroneous detection of a motion vector, i.e., where the position of a stationary object will fall within the search range in the next frame, it is possible to generate an interpolation frame that is highly dependent on the motion vector, reflecting the motion of the object.

If the magnitude of the camera motion is greater than the threshold value described above, the interpolation frame generation section 310 generates, as the interpolation frame, a frame that is obtained through a process including an arithmetic mean between the first and second frames. Thus, where there is a high possibility of an erroneous detection of a motion vector, it is possible to avoid generation of an inappropriate interpolation frame.

More specifically, if the magnitude of the camera motion is greater than the threshold value described above, the interpolation frame generation section 310 generates, as the interpolation frame, a synthetic frame between a motion-compensated interpolation frame and an arithmetic mean interpolation frame. Moreover, the synthesis ratio between the motion-compensated interpolation frame and the arithmetic mean interpolation frame is changed based on the magnitude of the camera motion. Therefore, it is possible to avoid generation of an unnatural moving picture containing abrupt changes in the content of the interpolation frame when the threshold value is passed, and it is possible to generate a more natural interpolation frame.

Moreover, the motion vector calculation section 302 divides each of the first and second frames contiguous with each other into a plurality of portions (e.g., macroblocks), and performs a matching operation between the first and second frames for each of the divided portions to calculate the motion vector for the portion. The interpolation frame generation section 310 generates the interpolation frame based on the motion vector calculated for each of these portions. Thus, it is possible to realize an interpolation process that reflects the motion of an object for each portion of the frame, and it is possible to generate a more appropriate interpolation frame.

Other Embodiments

Embodiment 1 has been described above as an example of the technique disclosed in the present application. However, the technique of this disclosure is not limited thereto, but is also applicable to other embodiments in which changes, replacements, additions, omissions, etc., are made as necessary. Different ones of the elements described in Embodiment 1 above may be combined together to obtain a new embodiment. In view to this, other embodiments are illustrated hereinbelow.

The synthesis section 306 sets α=1 when the magnitude of the camera motion is less than a predetermined threshold value, and linearly decreases α with respect to the magnitude of the camera motion when the threshold value is passed, as shown in FIG. 6, in the embodiment above, but the present disclosure is not limited thereto. The decrease of a with respect to the magnitude of the camera motion may be along a curve.

Figure 7:
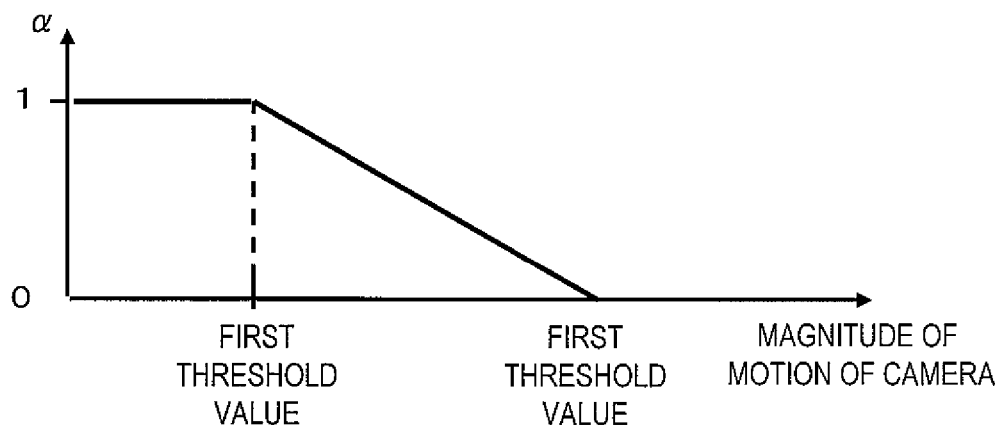
FIG. 7 is a graph showing an example in which two threshold values are provided for determining the interpolation frame synthesis ratio relative to the magnitude of motion of the digital video camera.

While one threshold value is set in the embodiment above, two or more threshold values may be set. For example, the synthesis section 306 may set α=1 when the magnitude of the camera motion is less than or equal to the first threshold value, set α=0 when it is greater than or equal to the second threshold value, and set α to a value between 0 to 1 when it is between the first threshold value and the second threshold value, as shown in FIG. 7. In this example, by setting the second threshold value to such a value that a stationary object will fall just within the search range of the block matching operation, it is possible to avoid generation of an interpolation frame based on an erroneous motion vector for a stationary object.

The interpolation frame to be employed when the magnitude of motion of the image capturing apparatus is greater than the predetermined threshold value is not limited to a synthetic frame between a motion-compensated interpolation frame and an arithmetic mean interpolation frame, but may be any frame as long as it is less dependent on the motion vector than a motion-compensated interpolation frame. For example, an arithmetic mean interpolation frame itself, or a first frame or a second frame itself may be used as an interpolation frame. For the latter case, the arithmetic mean interpolation image generation section 307 shown in FIG. 2 may be optional.

In the embodiment above, the technique of the present disclosure is applied to the digital video camera 100 (image capturing apparatus). However, the application of the technique of the present disclosure is not limited to the image capturing apparatus, but the technique is also applicable to an image processing apparatus capable of serving as the image processing section 160 described above, for example. The configuration of such an image processing apparatus is similar to that shown in FIG. 2, for example, and the operation thereof is similar to that shown in FIG. 3, for example. For example, the image processing apparatus can obtain data of a moving picture that has been generated by a video camera and stored in a storage medium, or data of a moving picture transmitted via a telecommunications network, at a later point in time, and insert an interpolation frame through the process described above to store the resultant data as another piece of moving picture data. In such a case, the image processing apparatus will obtain information representing the motion of the image capturing apparatus during the image capturing operation, in addition to the data of the moving picture.

The technique of the present disclosure may be further applicable to software (program) that defines the interpolation frame generating process described above. The operation defined by such a program is as shown in FIG. 3, for example. Such a program may be provided while being stored in a portable storage medium, or may be provided through a telecommunications network. With a processor provided in a computer executing such a program, it is possible to realize the various operations described in the embodiment above.

Embodiments have been described above as an illustration of the technique of the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The application of the technique of the present disclosure is not limited to the digital video camera 100. That is, the present disclosure is applicable to image processing apparatuses capable of converting the frame rate, such as digital still cameras, information terminals equipped with cameras, personal computers, and server computers.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No 2012-002738 filed Jan. 11, 2012, and No. 2013-000804 filed Jan. 8, 2013 the entire contents of which are hereby incorporated by reference.

The invention claimed is:

1. An image processing apparatus for generating an interpolation frame to be inserted between a first frame and a second frame, contiguous with each other, of a moving picture obtained by an image capturing apparatus, the image processing apparatus comprising:
  a motion vector calculation section configured to calculate a motion vector of an object by performing a matching operation between the first and second frames; and
  an interpolation frame generation section configured to generate the interpolation frame such that:
    the dependence of the interpolation frame on the calculated motion vector is increased if a detected magnitude of motion is less than or equal to a threshold value; and
    the dependence of the interpolation frame on the calculated motion vector is decreased if the detected magnitude of motion is greater than the threshold value;
  wherein the detected magnitude of motion represents motion of the image capturing apparatus from a point in time when the first frame is obtained to a point in time when the second frame is obtained, wherein the magnitude of motion is detected independent of content of the first and second frames.

2. The image processing apparatus of claim 1, wherein the interpolation frame generation section is configured to generate, as the interpolation frame, a frame representing a transitional state between the first and second frames dictated based on the motion vector if the magnitude of motion representing motion of the image capturing apparatus is less than a predetermined threshold value, and otherwise generate, as the interpolation frame, a frame that is less dependent on the motion vector than a frame representing the transitional state.

3. The image processing apparatus of claim 2, wherein the threshold value is set based on a size of a search range of the matching operation.

4. The image processing apparatus of claim 2, wherein the interpolation frame generation section is configured to generate, as the interpolation frame, a frame obtained through a process including an arithmetic mean between the first and second frames if the magnitude of motion representing motion of the image capturing apparatus is greater than the threshold value.

5. The image processing apparatus of claim 4, wherein the interpolation frame generation section is configured to generate, as the interpolation frame, a synthetic frame between a frame representing the transitional state and a frame obtained by an arithmetic mean between the first and second frames if the magnitude of motion representing motion of the image capturing apparatus is greater than the threshold value.

6. The image processing apparatus of claim 5, wherein the interpolation frame generation section is configured to generate the synthetic frame by synthesizing together a frame representing the transitional state and a frame obtained by an arithmetic mean between the first and second frames at a different ratio depending on the magnitude of motion representing motion of the image capturing apparatus.

7. The image processing apparatus of claim 2, wherein the interpolation frame generation section is configured to use the first frame or the second frame as the interpolation frame if the magnitude of motion of the image capturing apparatus is greater than the threshold value.

8. The image processing apparatus of claim 1, wherein:
the motion vector calculation section is configured to divide each of the first and second frames into a plurality of blocks to calculate the motion vector by performing a matching operation for each of the divided blocks; and
the interpolation frame generation section is configured to generate the interpolation frame based on the motion vector calculated for each of the blocks.

9. An image capturing apparatus comprising:
the image processing apparatus of claim 1;
an image capturing section configured to generate data of a moving picture including the first and second frames through an image capturing operation; and
a motion detector configured to detect a motion of the image capturing apparatus and output the magnitude of motion representing motion of the image capturing section.

10. A computer program, stored on a non-transitory computer-readable medium, to be executed by a computer mounted in an image processing apparatus for generating an interpolation frame to be inserted between a first frame and a second frame, contiguous with each other, of a moving picture obtained by an image capturing apparatus, the computer program instructing the computer to execute the steps of:
calculating a motion vector of an object by performing a matching operation between the first and second frames; and
generating the interpolation frame such that:
the dependence of the interpolation frame on the calculated motion vector is increased if a detected magnitude of motion is less than or equal to a threshold value; and
the dependence of the interpolation frame on the calculated motion vector is decreased if the detected magnitude of motion is greater than the threshold value;
wherein the detected magnitude of motion representing motion of the image capturing apparatus from a point in time when the first frame is obtained to a point in time when the second frame is obtained, wherein the magnitude of motion is detected independent of content of the first and second frames.

* * * * *